US008113706B2

(12) United States Patent
Lin

(10) Patent No.: US 8,113,706 B2
(45) Date of Patent: Feb. 14, 2012

(54) BACKLIGHT MODULE

(75) Inventor: Hsiu-Yu Lin, Shanhua Township, Tainan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 323 days.

(21) Appl. No.: 12/457,857

(22) Filed: Jun. 24, 2009

(65) Prior Publication Data
US 2010/0002418 A1 Jan. 7, 2010

(30) Foreign Application Priority Data

Jul. 2, 2008 (TW) ................................ 97211732 U

(51) Int. Cl.
*F21V 7/04* (2006.01)

(52) U.S. Cl. .......... 362/633; 362/634; 362/561; 349/58; 349/65

(58) Field of Classification Search .................... 362/33, 362/97.1, 97.2, 97.3, 367, 368, 373, 612, 362/613, 623, 633, 634; 349/58, 61, 62, 349/64, 65, 67, 70
See application file for complete search history.

(56) References Cited

U.S. PATENT DOCUMENTS

| 6,559,908 B2 * | 5/2003 | Hiratsuka et al. ............... 349/58 |
| 6,666,567 B1 | 12/2003 | Feldman et al. |
| 6,789,921 B1 | 9/2004 | Deloy et al. |
| 6,791,151 B2 | 9/2004 | Lin et al. |
| 6,930,737 B2 | 8/2005 | Weindorf et al. |
| 6,969,189 B2 | 11/2005 | Lee et al. |
| 6,979,102 B2 | 12/2005 | You |
| 6,979,114 B2 * | 12/2005 | Kao .............................. 362/633 |
| 7,025,474 B2 | 4/2006 | Campbell et al. |
| 7,036,956 B1 | 5/2006 | Chou |
| 7,093,971 B2 * | 8/2006 | Yu et al. ........................ 362/633 |
| 7,095,462 B2 * | 8/2006 | Ahn ............................... 349/58 |
| 7,190,423 B2 * | 3/2007 | Sugawara et al. ............... 349/58 |
| 7,275,842 B2 * | 10/2007 | Wang et al. .................... 362/373 |
| 7,430,026 B2 * | 9/2008 | Sakuma ........................... 349/58 |
| 7,876,398 B2 * | 1/2011 | Fukuda .......................... 349/67 |
| 2006/0171170 A1 | 8/2006 | Lee |
| 2007/0195223 A1 * | 8/2007 | Nishiyama et al. ............. 349/64 |
| 2008/0074903 A1 * | 3/2008 | Nam et al. ..................... 362/613 |
| 2008/0088767 A1 * | 4/2008 | Chen et al. ...................... 349/58 |
| 2008/0291356 A1 * | 11/2008 | Kim .............................. 349/58 |
| 2008/0303971 A1 * | 12/2008 | Lee et al. ....................... 349/58 |

* cited by examiner

*Primary Examiner* — Hargobind S Sawhney
(74) *Attorney, Agent, or Firm* — Bacon & Thomas, PLLC

(57) ABSTRACT

A backlight module, especially a side-edge type backlight module is disclosed. The backlight module comprises: a back plate having plural side walls, plural supporting elements locating on the connecting parts of the plural side walls, and a reflective sheet locating on the plural supporting elements. Therefore, an air space is maintained between the reflective sheet and the back plate of the backlight module. As a result, when the backlight module is operating, the heat produced by the light emitting units will not be transmitted to the reflective sheet of the backlight module during the operation. That is, even after long-term operation, the temperature of the reflective sheet of the backlight module can be maintained at a stable level.

10 Claims, 5 Drawing Sheets

BACKLIGHT MODULE

BACKGROUND OF THE INVENTION

1. Field of the Invention

The present invention relates to a backlight module, and more particularly, to a side-edge type backlight module.

2. Description of Related Art

With reference FIG. 1, which is a cross-sectional view of a conventional liquid crystal display device, the conventional liquid crystal display device comprises: a back plate 11, a light emitting diode light bar 12, a light guide plate 13 and a reflective sheet 14. The reflective sheet 14 is located between the light guide plate 13 and the back plate 11. The back plate 11 encloses the light emitting diode light bar 12, a light guide plate 13 and the reflective sheet 14 therein. Besides, the back plate 11 includes a bottom plate (not shown in the figure) and a side wall 111 protruding upwardly from the periphery of the bottom plate (not shown in the figure). The aforementioned light emitting diode light bar 12 is fixed on the side wall 111. Moreover, the conventional liquid crystal display device further comprises an optical film set 15 located above the light guide plate 13, for modulating the light emitting upwardly from the light guide plate 13.

After the conventional liquid crystal display device is completely assembled, a liquid crystal display panel 16 is located on the optical film set 15, wherein an upper frame 17 covers the aforementioned liquid crystal display panel 16 and the back plate 11. Besides, the side wall 171 of the upper frame 17 is fixed to the side wall 111 of the back plate 11, wherein the aforementioned elements of the conventional liquid crystal display device are fixed inside the back plate 11.

However, when the conventional liquid crystal display device is operated, the heat produced by the light emitting diode light bar 12 having plural light emitting diodes 121 is continuously transmitted to the side wall 111 of the back plate 11. Moreover, the heat is not only transmitted to the whole part of the back plate 11, but also transmitted upwardly to the reflective sheet 14 being in contact with the back plate 11. As a result, the temperature of the reflective sheet 14, the light guide plate 13, and the optical film set 15 increases gradually. The optical properties of these three elements vary with the increasing temperature. Therefore, the light guide plate 13 and the optical film set 15 will have warped deformation. Besides, the transmittivity and the responding speed of the liquid crystal on the liquid crystal display panel 16 will also deteriorate with time. That is, after long-term operation, the display properties of the conventional liquid crystal display device will be impaired.

Therefore, it is desirable to provide a backlight module which can prevent the heat produced by the light emitting unit being transmitted to the optical elements of the backlight module.

SUMMARY OF THE INVENTION

The object of the present invention is to provide a backlight module, which can prevent the heat produced by the light emitting unit being transmitted upwardly to the reflective sheet.

To achieve the object, the backlight module of the present invention comprises: a back plate having plural side walls, plural supporting elements locating on the connecting parts of the plural side walls, and a reflective sheet locating on the plural supporting elements.

As the backlight module of the present invention has plural supporting elements for supporting the reflective sheet above the back plate thereof, the reflective sheet can be maintained a certain distance from the back plate, wherein an air space is sandwiched between the reflective sheet and the back plate. Besides, the supporting elements are preferably made of material having poor heat conductivity, such as plastic.

The supporting elements of the backlight module of the present invention can be fixed to the bottom plate of the back plate by any kind of fixing means, these supporting elements are preferably fixed to the side wall of the back plate by the bolt-gap fixing means, or preferably fixed to the bottom plate of the back plate by the screw fixing means. Besides, the backlight module of the present invention can further comprise a heat guide sheet at any position therein, wherein the heat guide sheet is preferably formed on the bottom plate of the back plate or sandwiched between the back plate and the reflective sheet. The backlight module of the present invention can further comprise any kind of heat guide sheet, wherein the heat guide sheet is preferably a graphite sheet. The backlight module of the present invention can further comprise a heat guide sheet having any size, wherein the size of the heat guide sheet is preferably the same as the size of the reflective sheet. The backlight module of the present invention can have any kind of light emitting unit, wherein the light emitting unit is preferably a light emitting diode light bar or a cold cathode fluorescent lamp. The light emitting diode light bar can preferably includes plural light emitting diodes. The light emitting unit of the back light module of the present invention can be formed at any position therein, wherein the light emitting unit is preferably formed on the side wall of the back plate thereof. The backlight module of the present invention can further comprise an optical film set, wherein the optical film set is preferably located above the reflective sheet.

Other objects, advantages, and novel features of the invention will become more apparent from the following detailed description as taken in conjunction with the accompanying drawings.

DETAILED DESCRIPTION OF THE PREFERRED EMBODIMENT

Figure 1:
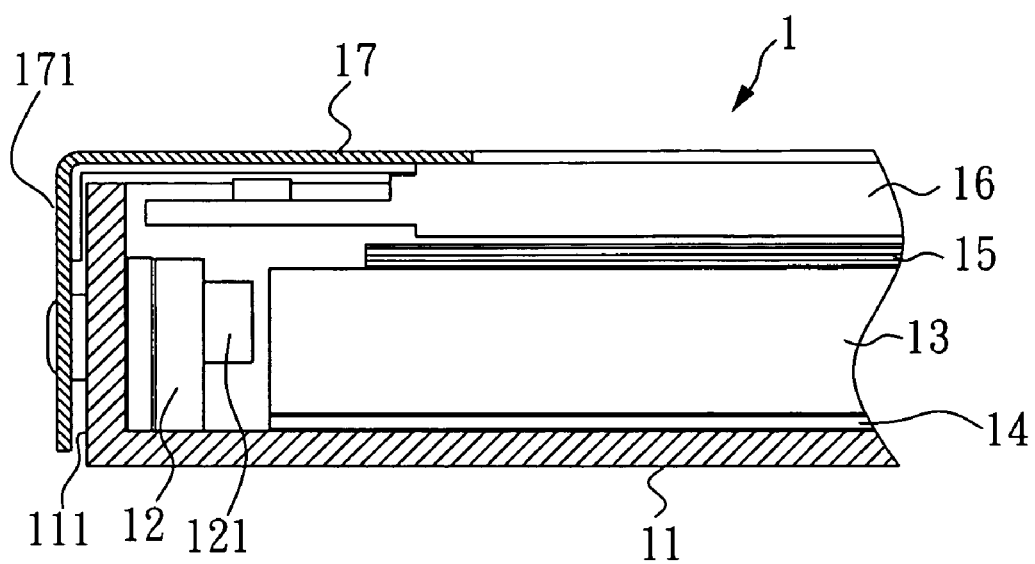
FIG. 1 is a cross-sectional view of a conventional liquid crystal display device.
Figure 2:
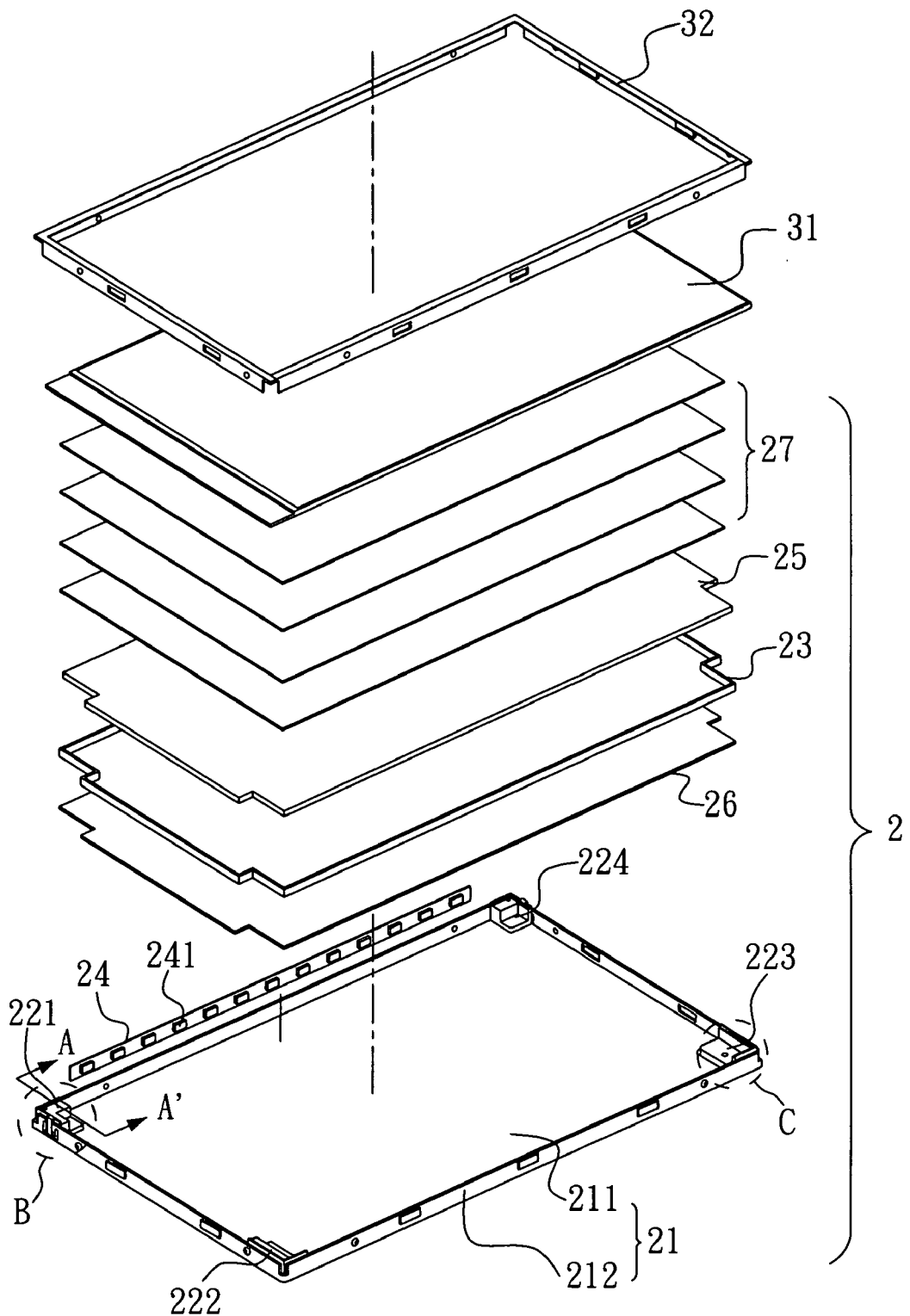
FIG. 2 is an exploded view of a liquid crystal display device having the backlight module of the present invention.
Figure 3:
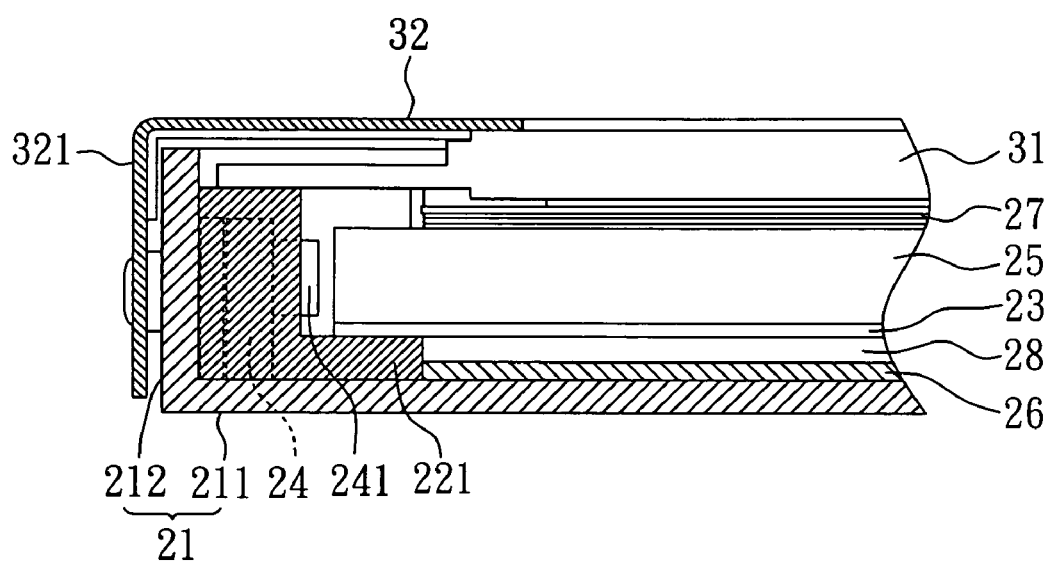
FIG. 3 is a cross-sectional view taken along the AA' plane of FIG. 2.

With reference to FIGS. 2 and 3, wherein FIG. 2 is an exploded view of a liquid crystal display device having the backlight module of the present invention, and FIG. 3 is a cross-sectional view taken along the AA' plane of FIG. 2, the backlight module 2 of the present invention comprises: a back plate 21, four supporting elements 221, 222, 223 and 224, and a reflective sheet 23 locating on these four supporting elements 221, 222, 223 and 224. Besides, the backlight module 2 of the present invention can further comprise a light emitting diode light bar 24, a light guide plate 25, a heat guide sheet 26, and an optical film set 27.

As shown in FIGS. 2 and 3, the back plate 21 includes a bottom plate 211 and a side wall 212 protruding from the periphery of the bottom plate 211, for enclosing these four supporting elements 221, 222, 223 and 224, the reflective sheet 23, the light emitting diode light bar 24, the light guide plate 25, the heat guide sheet 26, and the optical film set 27 therein.

As shown in FIG. 2, the shape of the back plate 21 is rectangular. The four supporting elements 221, 222, 223 and 224 are respectively located on the four corners of the back plate 21. Besides, these four supporting elements 221, 222, 223 and 224 support the reflective sheet 23 above the bottom plate 211 of the back plate 21. Therefore, an air space 28 is maintained between the reflective sheet 23 and the back plate 21, as shown in FIG. 3. Moreover, the light emitting diode light bar 24 is located on the side wall 212 of the back plate 21. Besides, the light guide plate 25 and the optical film set 27 are located above the reflective sheet 23 sequentially.

For the reason that heat cannot be easily transmitted by the air space 28, the air space 28 can be used as a heat insulating layer, for preventing the heat transmitted on the back plate 21 from being transmitted to the reflective sheet 23. It should be noted that, even though there are four supporting elements 221, 222, 223 and 224 in FIG. 2, the quantity of the supporting elements of the backlight module on the present invention is not thus limited. That is, the backlight module of the present invention can have any quantity of the supporting elements in different kind of application, such as the backlight module of a large-sized liquid crystal display TV. In general, the quantity of the supporting elements can be between 4 and 8. Besides, the supporting elements can be made of material having poor heat conductivity, such as plastic, for restricting the heat transmitted therein.

As described above, as the optical film set 27 is located above the light guide plate 25 for modulating the light emitting upwardly from the light guide plate 25, the light intensity provided by the backlight module of the present invention can be distributed more evenly. Moreover, as the backlight module of the present invention further comprises a heat guide sheet 26 locating on the bottom plate 211, the heat produced by the light emitting diode light bar 24 can be distributed to the whole part of the back plate 21 rapidly. The heat guide sheet 26 is preferably a graphite sheet, and the size of the heat guide sheet 26 is preferably the same as the size of the reflective sheet 23.

When a liquid crystal display device having the backlight module of the present invention is completely assembled, a liquid crystal display panel 31 is located above the aforementioned optical film set 27, and an upper frame 32 is located further above the liquid crystal display panel 31 and the back plate 21. The upper frame 32 has an upper frame side wall 321 fixing with the side wall 212 of the back plate 21, as shown in FIG. 3. The upper frame 32 and the back plate 21 enclose the aforementioned four supporting elements 221, 222, 223 and 224, the reflective sheet 23, the light emitting diode light bar 24, the light guide plate 25, the heat guide sheet 26, the optical film set 27 and the liquid crystal display panel 31 thereinbetween.

As a result, when the liquid crystal display device is operating, the heat produced by the light emitting diode light bar 24 having plural light emitting diodes 241 will be continuously transmitted to the side wall 212 and the bottom plate 211 of the back plate 21. Moreover, as the back plate 21 is made of metal having high heat conductivity, such as aluminum, the aforementioned heat will be gradually distributed to the whole part of the back plate 21. Besides, as the backlight module of the present invention further comprises a heat guide sheet 26 located on the bottom plate 21 of the back plate 21, the aforementioned heat will be distributed to the whole part of the back plate 21 more rapidly, preventing any non-uniformity of heat distribution on the back plate 21 from happening.

As described above, the reflective sheet 23 is supported by the four supporting elements 221, 222, 223 and 224 being located above the bottom plate 211 of the back plate 21, wherein an the air space 28 is sandwiched between the reflective sheet 23 and the back plate 21. Besides, the four supporting elements 221, 222, 223 and 224 are made of material having poor heat conductivity, such as plastic. Therefore, when the backlight module of the present invention is in operation, the heat transmitted in the back plate 21 will not be transmitted to the reflective sheet 23, nor to the light guide plate 25, the optical film 27 and liquid crystal display panel 31.

As a result, even after long-term operation, the temperature of the light guide plate 25, the optical film set 27, and liquid crystal display panel 31 of the liquid crystal display device can all be maintained at a stable level. Therefore, the optical properties of these elements will not vary to any particular degree. In other words, even after long-term operation, the properties of the backlight module of the present invention and the display properties of the liquid crystal display device having the backlight module of the present invention will all be maintained at a stable level, without suffering deterioration.

The statistical results of the temperature values measured on several measuring points located on the back plate, the light guide plate and the liquid crystal display panel of a conventional liquid crystal display device, after the conventional liquid crystal display device having operated for a certain period of time (around 2 hours), are listed in Table 1 as following:

TABLE 1

|  | Min. | Max. | Avg. | Difference between Max. and Min. | Unit |
|---|---|---|---|---|---|
| back plate | 33.2 | 50.1 | 38.2 | 16.9 | ° C. |
| light guide plate | 33.2 | 49.0 | 38.1 | 15.8 | ° C. |
| liquid crystal display panel | 32.6 | 45.2 | 36.8 | 12.6 | ° C. |

The statistical results of the temperature values measured on several measuring points located on the back plate, the light guide plate and the liquid crystal display panel of a liquid crystal display device having the backlight module of the present invention, after the liquid crystal display device having operated for a certain period of time (around 2 hours), are listed in Table 2 as following:

TABLE 2

|  | Min. | Max. | Avg. | Difference between Max. and Min. | Unit |
|---|---|---|---|---|---|
| back plate | 37.1 | 43.6 | 39.2 | 6.5 | ° C. |
| light guide plate | 35.7 | 42.0 | 37.2 | 6.3 | ° C. |
| liquid crystal display panel | 35.2 | 40.2 | 36.4 | 5.0 | ° C. |

As shown in Table 1 and Table 2 above, in the liquid crystal display device having the backlight module of the present invention, the maximum value (i.e. the highest temperature) of the light guide plate and the liquid crystal panel are much lower than the maximum value of the light guide plate and the liquid crystal panel of the conventional liquid crystal display device. Moreover, the "difference between the maximum value and the minimum value" (i.e. an indication of the distribution of the temperature) of the three elements (i.e. the back plate, the light guide plate and the liquid crystal display panel) of the liquid crystal display device having the backlight module of the present invention are all much lower than the corresponding "difference between the maximum value and the minimum value" of the three elements of the conventional liquid crystal display device.

In other words, in the liquid crystal display device having the backlight module of the present invention, the temperature of the light guide plate and the liquid crystal display panel are not only lower, but also distributed more evenly. As a result, after long-term operation, the optical properties of the light guide plate and the liquid crystal display panel of the liquid crystal display device having the backlight module of the present invention can be maintained at a stable level and be distributed more evenly, without impairment.

In the backlight module of the present invention, the four supporting element 221, 222, 223 and 224 can be fixed to the bottom plate 211 or the side wall 212 of the back plate 21 by any kind of fixing means. As shown in FIG. 2, the four supporting element 221, 222, 223 and 224 are fixed to the bottom plate 211 or the side wall 212 of the back plate 21 by two different kinds of fixing means.

Figure 4A:
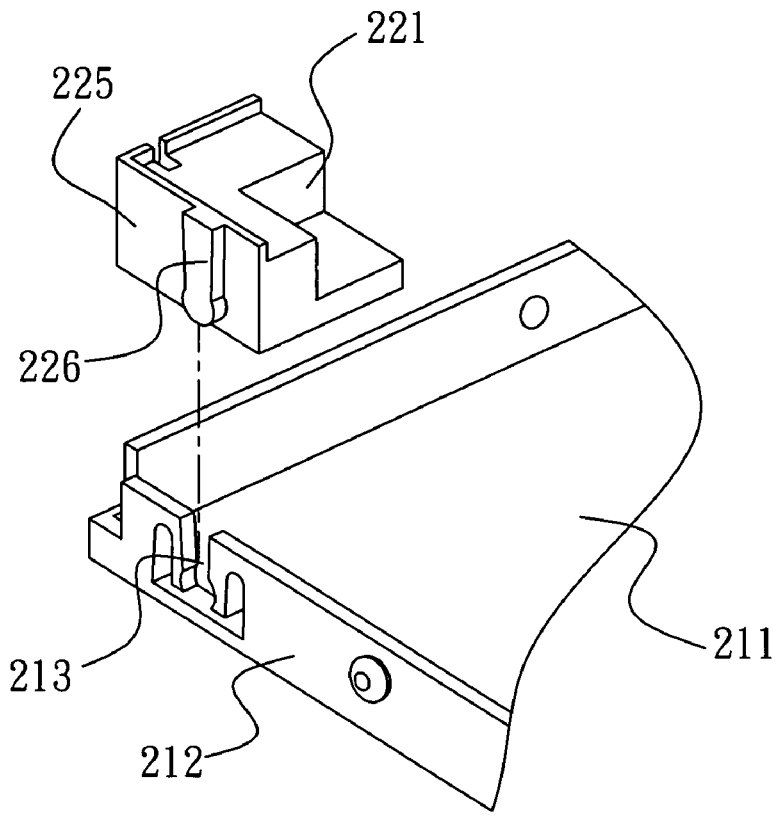
FIG. 4A and FIG. 4B are perspective views showing the supporting element in area B of FIG. 2, which is fixed to the side wall of the back plate by the bolt-gap fixing means.
Figure 4B:
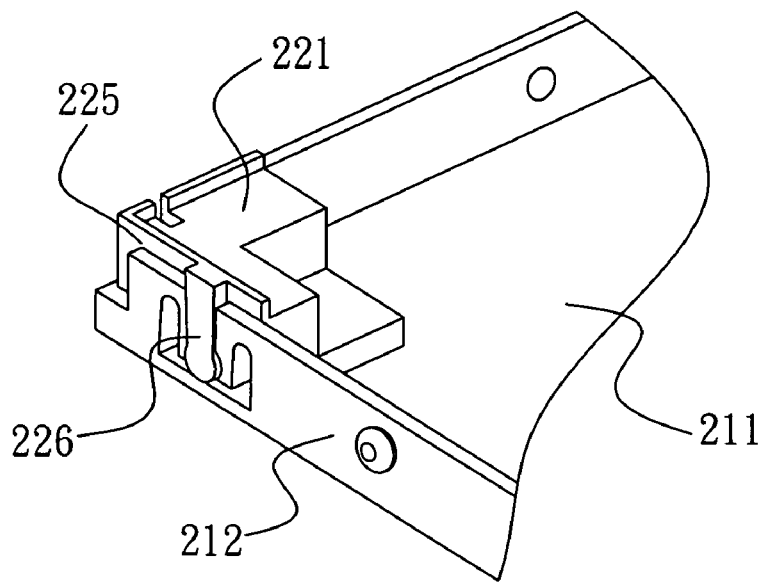
Figure 5A:
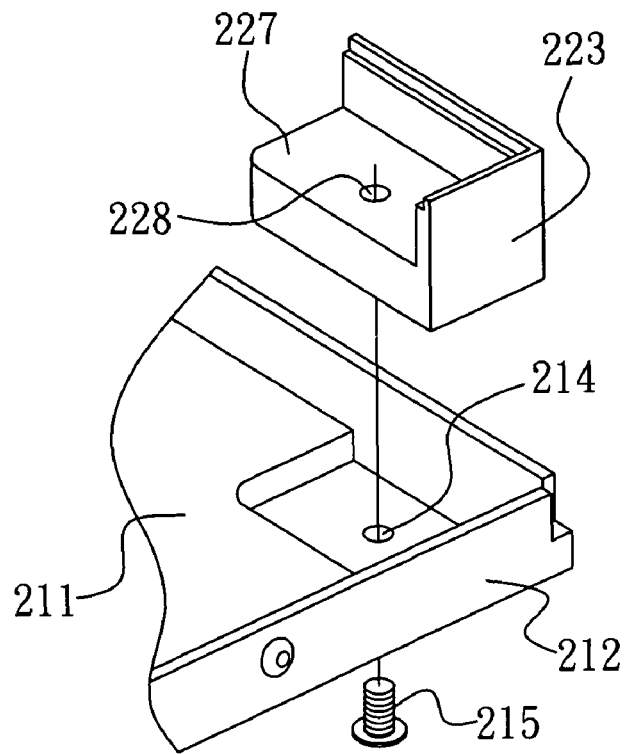
FIG. 5A and FIG. 5B are perspective views showing the supporting element in area C of FIG. 2, which is fixed to the side wall of the back plate by the screw fixing means.
Figure 5B:
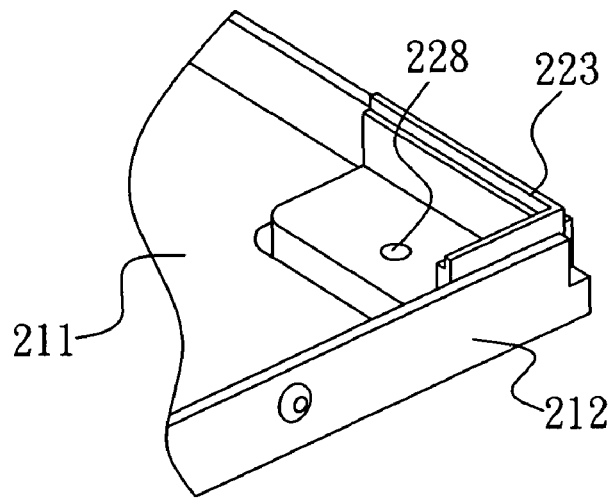

In the following, these two different kinds of fixing means will be described with reference to FIGS. 4A, 4B, 5A and 5B. In FIGS. 4A and 4B, the supporting element 221 in area B of FIG. 2 is fixed to the side wall 212 of the back plate 21 by the bolt-gap fixing means. In FIGS. 5A and 5B, the supporting element 223 in area C of FIG. 2 is fixed to the bottom plate 211 of the back plate 21 by the screw fixing means.

In FIG. 4A, the supporting element 221 has a bolt 226 on the side surface 225 thereof. The side wall 212 of the back plate 21 has a gap 213, wherein the shape of the gap 213 corresponds to the shape of the bolt 226. Then, as shown in FIG. 4B, when the supporting element 221 is placed on the bottom plate 211 of the back plate 21, the bolt 226 slides into and fixes in the gap 213. As a result, the supporting element 221 can be easily fixed to the side wall 212 of the back plate 21.

As shown in FIG. 5A, the supporting element 223 has a tapped hole 228 on a supporting surface 227 thereof, and the bottom plate 211 of the back plate 21 also has a tapped hole 214. The screw-thread on the tapped hole 228 and the tapped hole 214 both correspond to a fixture screw 215. Then, as shown in FIG. 5B, after the supporting element 223 is placed on the bottom plate 211 of the back plate 21, the fixture screw 215 is screwed into the tapped hole 214 and tapped hole 228 sequentially. Therefore, the supporting element 223 is fixed to the bottom plate 211 of the back plate 21.

As a result, the four supporting elements 221, 222, 223 and 224 can be easily fixed to the bottom plate 211 or side wall 212 of the back plate 21. Therefore, the manufacturing process of the backlight module of the present invention is simplified, and the time for manufacturing the backlight module of the present invention is also reduced.

As described above, by having plural supporting elements for supporting the reflective sheet, the reflective sheet of the backlight module of the present invention can be maintained a certain distance from the back plate, wherein an air space is sandwiched between the reflective sheet and the back plate. Besides, air does not enable heat to be transmitted well, and the supporting elements are made of material having poor heat conductivity, such as plastic.

Therefore, when a liquid crystal display device having the backlight module of the present invention is operated, the heat produced by the light emitting unit can only be transmitted in the back plate, without any possibility to be transmitted upwardly. That is, even after long-term operation, the temperature of the light guide plate, the optical film set, and the liquid crystal display panel of a liquid crystal display device having the backlight module of the present invention can be maintained at a low level, preventing the optical properties of these elements from varying a lot. Moreover, as the elements of the liquid crystal display device having the backlight module of the present invention can remain at their original position after long-term operation, the display property of the liquid crystal display device can be maintained at a stable level, without any irreversible deterioration.

Although the present invention has been explained in relation to its preferred embodiment, it is to be understood that many other possible modifications and variations can be made without departing from the scope of the invention as hereinafter claimed.

What is claimed is:

1. A backlight module comprising:
   a back plate, having plural side walls;
   plural supporting elements, located on connecting parts of the plural side walls;
   a reflective sheet, located on the plural supporting elements; and
   a light emitting unit, located on one of the plural side walls.

2. The backlight module as claimed in claim 1, wherein the plural supporting elements are fixed to the side walls of the back plate, for fixing their position on the back plate.

3. The backlight module as claimed in claim 1, wherein each of the plural supporting elements is fixed on back plate by means of a screw.

4. The backlight module as claimed in claim 1, further comprising a heat guide sheet located on the back plate.

5. The backlight module as claimed in claim 4, wherein the heat guide sheet is sandwiched between the back plate and the reflective sheet.

6. The backlight module as claimed in claim 4, wherein the heat guide sheet is a graphite sheet.

7. The backlight module as claimed in claim 4, wherein the size of the heat guide sheet is the same as the size of the reflective sheet.

8. The backlight module as claimed in claim 1, wherein the light emitting unit is a light emitting diode light bar.

9. The backlight module as claimed in claim 8, wherein light emitting diode light bar includes plural light emitting diodes.

10. The backlight module as claimed in claim 1, further comprising an optical film set locating above the reflective sheet.

* * * * *